Figure 1:
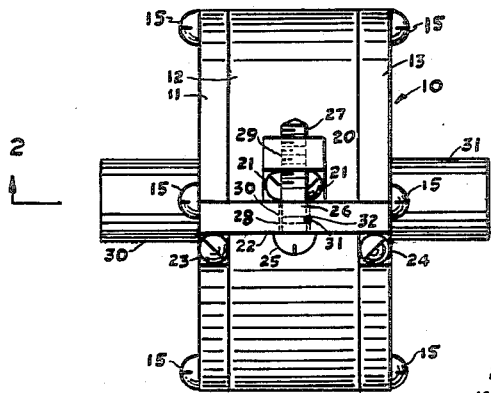

July 1, 1958 W. S. EVERETT 2,841,386
MAGNETOSTRICTIVE ACCELEROMETER DEVICE
Filed Dec. 9, 1953 2 Sheets-Sheet 1

INVENTOR.
WILHELM S. EVERETT
BY
ATTORNEYS

July 1, 1958 W. S. EVERETT 2,841,386
MAGNETOSTRICTIVE ACCELEROMETER DEVICE
Filed Dec. 9, 1953 2 Sheets-Sheet 2
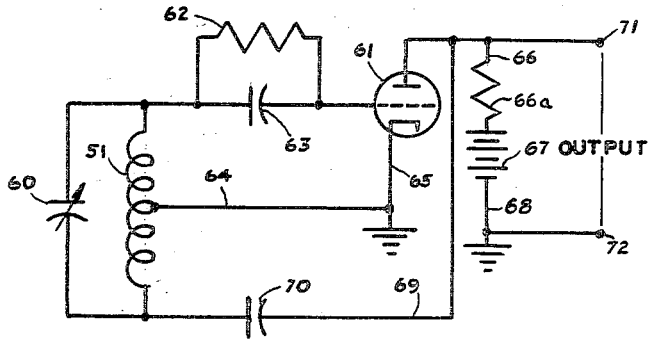
FIG. 4
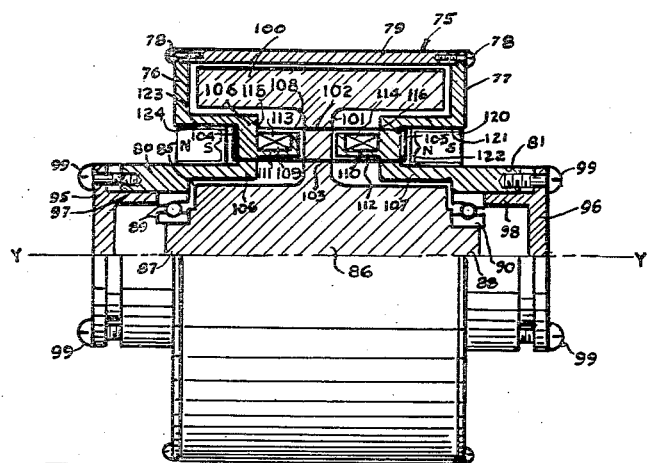
FIG. 5
FIG. 6
*INVENTOR.*
WILHELM S. EVERETT
BY
*ATTORNEYS*

United States Patent Office 2,841,386
Patented July 1, 1958

2,841,386
MAGNETOSTRICTIVE ACCELEROMETER DEVICE

Wilhelm S. Everett, Santa Paula, Calif., assignor to the United States of America as represented by the Secretary of the Navy Application December 9, 1953, Serial No. 397,280

8 Claims. (Cl. 264—1)

(Granted under Title 35, U. S. Code (1952), sec. 266)

The invention described herein may be manufactured and used by or for the Government of the United States of America for governmental purposes without the payment of any royalties thereon or therefor.

The present invention relates to a magnetostrictive accelerometer device and more particularly to a magnetostrictive accelerometer device including a magnetostrictive member and a coil member which are adapted to be connected into an electrical network in such a manner that the output of the network varies in accordance with changes in the measured characteristic.

In the operation of high-speed aircraft and the like, it is desirable to provide a means which indicates the acceleration forces acting on the craft in order to analyze the operational characteristics and performance thereof. In the case of guided missiles or pilotless aircraft, it is particularly important to provide a means whereby such information may be automatically transmitted to control points during flight of the craft. Such means must be capable of withstanding severe strains and yet must provide reliable and accurate information. Accelerometers previously used have proven unsatisfactory at low values of acceleration since the hysteresis effects encountered therein cause inaccuracies of the readings obtained in this range of values. Furthermore, prior art devices are often limited to measuring either acceleration or deceleration forces, whereas it is desirable to measure both of these characteristics with the same device.

It is well-known in the art that under the influence of internal stresses, certain materials display a change of magnetic permeability when subjected to a magnetizing field. Hereinafter, the term "magnetostrictive" as applied either to a substance or a member is intended to designate a substance or member which displays such a characteristic. Various magnetostrictive effects are described generally in the "General Electric Review" of March 1942, pages 161–163 and in the appended bibliography.

The present invention utilizes an arrangement which is rugged yet reliable, and which is adapted to be utilized with a means for transmitting information to control points during flight of the aircraft. A magnetostrictive member is so mounted that acceleratioin forces are adapted to stress the member and thereby change its magnetic permeability. Such changes in the magnetic permeability of the magnetostrictive member alter the inductance of a member in a suitable electrical network whereby the output of the network varies in accordance with the changes in acceleration. Hysteresis effects are eliminated in the invention device by providing a means which produces a constant magnetic flux which saturates the magnetostrictive member, and the device is so constructed and arranged that it measures both acceleration and deceleration forces. The present invention also provides a means of prestressing the magnetostrictive member whereby the band width of the electronically transmitted information may be controlled.

An object of the present invention is the provision of a new and novel magnetostrictive accelerometer device which is adapted to measure both acceleration and deceleration forces acting thereon.

Another object is to provide a new and novel magnetostrictive accelerometer device wherein hysteresis effects are substantially eliminated.

A further object of the invention is the provision of a means to control the band width of the electronically transmitted information provided by the invention device.

Yet another object is to provide a new and novel magnetostrictive accelerometer device which is simple and rugged in construction, yet reliable and accurate in operation.

Figure 2:
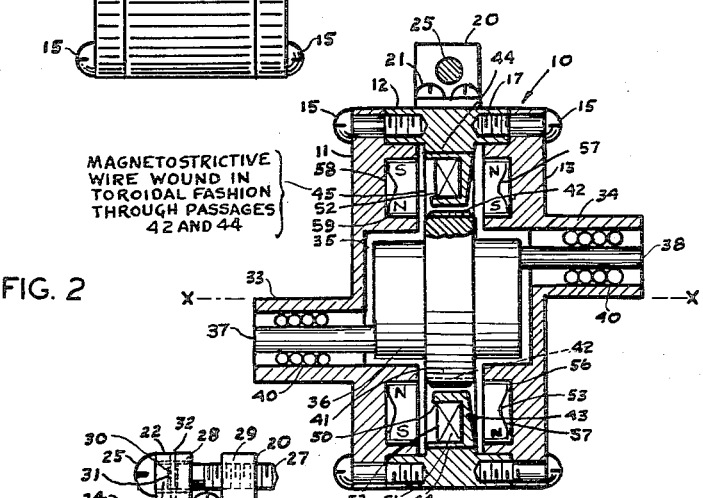
Figure 3:
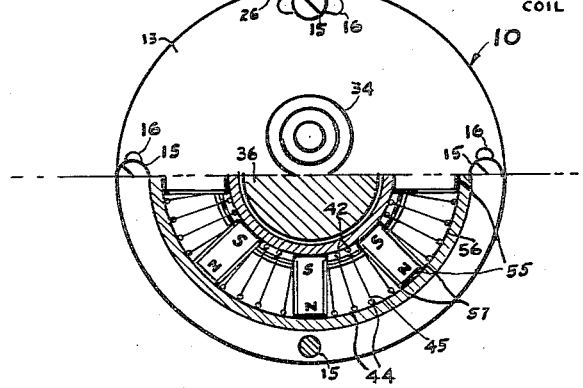

Other objects and many of the attendant advantages of this invention will be readily appreciated as the same becomes better understood by reference to the following detailed description when considered in connection with the accompanying drawings wherein:

Fig. 1 is a plan view of a linear accelerometer according to the invention,

Fig. 2 shows a sectional view of the device taken on the line 2—2 of Fig. 1 looking in the direction of the arrows, Fig. 3 is a side view, partly in section of the device shown in Fig. 1, Fig. 4 shows an electrical network with which the invention device may be utilized, Fig. 5 illustrates an elevation view, partly in section, of an angular accelerometer according to the invention, and Fig. 6 is an end view of the device shown in Fig. 5.

Referring now to the drawings, wherein like reference characters designate like or corresponding parts throughout the several views, there is shown in Figs. 1 to 3 a linear accelerometer having a body member indicated generally by reference numeral 10 and comprising three portions 11, 12 and 13 composed of a nonmagnetic substance such as bronze, synthetic resins and the like. As may be more clearly seen in Figs. 2 and 3, portions 11, 12 and 13 are secured together by means of four equally circumferentially spaced bolts 15 disposed on either side of member 12, the bolts extending through solts 16 formed in members 11 and 13 and being threaded into correspondingly threaded openings 17 formed in member 12.

As seen most clearly in Figs. 1 to 3, a bracket 20 is bolted to the outer periphery of member 12 by means of bolts 21, and a bracket 22 is bolted at its opposite end portions to members 11 and 13 by means of bolts 23 and 24 respectively. An adjusting bolt 25 comprises a reduced portion 26 and a threaded end portion 27, portion 26 fitting rotatably within an opening 28 formed in bracket 22 and portion 27 being threaded into a correspondingly threaded opening 29 formed in bracket 20. A circumferential groove 30 is formed in the outer periphery of portion 26 and a pin 31 is tightly fitted within an opening 32 drilled in bracket 22 so as to communicate perpendicularly with opening 28. The lower end of the pin lies within groove 30 whereby axial movement of bolt 25 within opening 28 is prevented, yet bolt 25 may rotate within the opening. It is apparent that by releasing bolts 15, the relative rotational positions of members 11 and 13 may be adjusted with respect to member 12 by rotating adjusting bolt 25. Bolts 15 may then be secured in openings 17 through slots 16 to maintain the relative rotational positions of members 11 and 13 with respect to member 12.

Member 11 has formed integral therewith a longitudinally extending cylindrical portion 33 which is eccentric to the longitudinal axis $x$—$x$ of member 12 and member 13 has formed integral therewith a corresponding longitudinally extending cylindrical portion 34 which is also eccentric to axis $x$—$x$ and which is disposed diametrically opposite portion 33 with respect to axis x—x.

A cavity 35 is formed within body member 10 and an inertia member 36 of relatively large mass is disposed within the cavity, member 36 having oppositely extending cylindrical portions 37 and 38 which are disposed eccentrically with respect to axis x—x. Portions 37 and 38 are journaled within portions 33 and 34 respectively by means of linear ball bearings 40 whereby member 36 is adapted to move longitudinally with respect to the body member.

Member 36 has an outwardly radially extending portion 41 formed on the outer periphery thereof and a plurality of longitudinally extending passages 42 are formed therethrough at circumferentially spaced points adjacent its outer periphery. Member 12 has an inwardly radially extending portion 43 formed on the inner periphery thereof which is in radial alignment with portion 41, and a plurality of longitudinally extending passages 44 corresponding to passages 42 are formed therethrough.

As seen in Figs. 2 and 3, a continuous magnetostrictive wire 45 is disposed within passages 42 and 44 and serves to connect together members 12 and 36. The wire is tightly laced through the passages such that it extends continuously about the outer circumference of portion 41 and defines an electrical core of toroidal configuration when in assembled position as shown. The wire is preferably of small diameter, being on the order of .02 inch, and it may be formed of any suitable magnetostrictive material such as Permalloy, nickel and the like.

A cup-shaped groove 50 extends circumferentially about portion 43 and an electrical coil 51 formed of varnished copper wire or the like is disposed therein, being held in place by a snap ring 52. Suitable leads (not shown) are provided for connecting the coil in an electrical circuit as will hereinafter be more fully explained. The coil is disposed radially outward of the outer periphery of portion 41 and is surrounded by the toroidally-shaped core formed by wire 45.

As seen in Fig. 3, a plurality of permanent magnets 55 are circumferentially spaced within a groove 56 formed in portion 13 and are secured in position by suitable means such as snap rings 57 or the like. A corresponding number of permanent magnets 58 are similarly disposed within a groove 59 formed in portion 11, and as seen in Fig. 2, the magnets in members 11 and 13 are respectively disposed such that the north poles of one set of magnets 55 are opposite the south poles of the other set of magnets 58 whereby a maintenance flux of constant magnitude is created about wire 45 such that the magnetostrictive member is saturated at all times and hysteresis effects are eliminated during operation of the device. The magnets may be composed of a suitable material which is durable and which retains its magnetism over long periods of time such as sintered iron, Alnico and the like.

It should be noted that members 11 and 13 are secured together by means of bracket 22 which is bolted to the respective members, and that portions 37 and 38 of member 36 are disposed within eccentric portions 33 and 34 of members 11 and 13 respectively. Therefore, when bolts 15 are released and adjusting bolt 25 is actuated, members 11, 13 and 36 move as a unit with respect to member 12. In this manner, member 36 may be adjusted rotationally with respect to member 12 and wire 45 is accordingly selectively prestressed for a purpose which will hereinafter be more fully explained.

When in use, the body member portions 11 and 13 are suitably secured to some supporting structure in the aircraft or the like such that these portions are relatively fixed. Consequently, when acceleration forces act on the aircraft and the device, inertia member 36 will tend to move relative to the assembled body member.

The device is suitably mounted such that the axis x—x of the invention device is aligned in the direction in which it is desired to measure linear acceleration forces. As member 36 moves with respect to the body member, wire 45 is stressed and the magnetic permeability of the wire is varied in accordance with the acceleration force acting on the inertia member. It is apparent that both acceleration and deceleration forces will cause relative movement between the body member and the inertia member.

The effect of the change in the magnetic permeability of the wire core in response to changes in acceleration forces may be utilized in a suitable system for converting such changes into electronic intelligence which may be transmitted to desired points. There is shown in Fig. 4 an electrical network adapted to be used with the invention device, and the coil numbered 51 corresponds to the coil 51 of the device shown in Fig. 2. As pointed out previously, suitable leads which are not shown in Fig. 2 are provided in a conventional manner to connect the coil into the network as shown in Fig. 4.

The electrical network comprises a conventional Hartley oscillator, the output of which may be connected to any conventional transmitter whereby the output of the circuit is transmitted to desired control stations. The adjustable capacitor 60 is adapted to control the frequency of the oscillator, and capacitor 60 in cooperation with coil 51 forms a tank circuit which is connected in the grid circuit of oscillator tube 61. The grid leak resistor 62 and capacitor 63 connected in parallel therewith serve to develop the bias voltage for the oscillator. Lead 64 which is center-tapped to coil 51 is connected to lead 65 which connects the cathode of the tube to ground. The plate of the tube is connected by means of lead 66 to a resistor 66a and thence to a B-battery 67 which is in turn connected to ground by lead 68. Lead 69 and capacitor 70 serve to couple the A. C. from the plate circuit but block the D. C. of the power supply 67. The output is taken across terminals 71 and 72.

Movements of inertia member 36 relative to body member 10 due to acceleration forces acting on the device cause changes in the magnetic permeability and therefore the reluctance of the wire core 45. Such changes in the reluctance of the core will cause the inductance of coil 51 to vary accordingly, and since the coil 51 is connected in the tank circuit of the oscillator, the frequency of the oscillator circuit and therefore the output of the circuit vary in accordance with the acceleration forces acting on the invention device. It should be understood that other electrical networks may also be employed with the invention device and that the network of Fig. 4 is shown merely for the purpose of illustration.

By prestressing wire 45, the percentage of change of inductance in coil 51 may be controlled and consequently the band width of the electrical output of the network shown in Fig. 4 may be adjusted. The band width of the electrical network utilized with the invention device may therefore be selected to give optimum results depending on the various operating conditions encountered. It should be noted that when members 11 and 13 are moved relative to member 12 so as to prestress wire 45, the relative movement between the inertia member and the body member is in a plane at right angles to the plane of relative movement between the inertia member and the body member when acted upon by acceleration forces, whereby prestressing of the wire does not affect the usual operation of the device.

Referring now to Fig. 5, there is shown an angular accelerometer having a body member indicated generally by reference numeral 75 and comprising two lateral portions 76 and 77 connected by means of bolts 78 to opposite ends of a cylindrical portion 79. The body member is formed of a substance similar to that of body member 10 in Fig. 1, and it is symmetrical about its longitudinal axis y—y. Member 76 has formed integral therewith a longitudinally extending hollow cylindrical portion 80 which is concentric with axis y—y, and member 77 has formed integral therewith a corresponding longitudinally extending hollow cylindrical portion 81 which is also concentric with axis y—y.

A cavity 85 is formed within body member 75 and an inertia member 86 is disposed within the cavity, member 86 having oppositely extending cylindrical portions 87 and 88 which are concentrically disposed with respect to axis y—y. Portions 87 and 88 are journaled on rotary bearings 89 and 90 which are slidably fitted within the inner periphery of portions 80 and 81 respectively whereby member 86 is adapted to move rotationally with respect to the body member. Adjustment plates 95 and 96 have cylindrical flange portions 97 and 98 which are slidably positioned within portions 80 and 81 respectively, and adjusting bolts 99 are threaded through suitable openings in the adjustment plates into correspondingly threaded openings in portions 80 and 81. The position of the adjustment plates may accordingly be adjusted by actuating bolts 99 in the proper direction, and in this manner, the relative longitudinal position of member 86 with respect to the body member may be adjusted.

Member 86 has a rim portion 100 of relatively large mass connected thereto by means of a radially extending circumferential neck portion 101, a first set of longitudinally extending passages 102 being formed therethrough at circumferentially spaced points and a second set of longitudinally extending passages 103 being formed therethrough at circumferentially spaced points radially inward of said first set of passages. Members 76 and 77 have corresponding sets of U-shaped passages 104 and 105 formed in portions 106 and 107 thereof respectively, and a continuous magnetostrictive wire 108 similar to wire 45 in Fig. 2 is disposed within passages 102—105, thereby serving to connect together member 86 and the body member. The wire is tightly laced through the passages such that it extends continuously circumferentially about axis y—y and defines an electrical core of toroidal configuration when in assembled position as shown. It is evident that by actuating bolts 99 so as to move member 86 with respect to the body member, wire 108 may be selectively prestressed for the purpose previously described.

Cup-shaped grooves 109 and 110 extend circumferentially about longitudinally extending flanges 111 and 112 formed on portions 106 and 107 respectively, and electrical coils 113 and 114 similar to coils 51 in Fig. 2 are disposed within the respective grooves, being held in place by suitable means such as snap rings 115 and 116. Suitable leads (not shown) are provided for connecting the coils in an electrical network similar to that shown in Fig. 4, the two coils 113 and 114 preferably being connected in series and replacing coil 51 shown in Fig. 4. Coils 113 and 114 are surrounded by the toroidally shaped core formed by wire 108.

As more clearly seen in Fig. 6, a plurality of permanent magnets 120 are circumferentially spaced within a groove 121 formed in member 77 and are secured in position by suitable means such as snap rings 122 or the like. A corresponding number of permanent magnets 123 are similarly disposed within a groove 124 formed in member 76, and as may be seen in Fig. 5, the magnets in members 76 and 77 are respectively disposed such that the north poles of one set of magnets are facing the south poles of the other set of magnets whereby a maintenance flux of constant magnitude is created about wire 108 such that the magnetostrictive member is saturated at all times and by hysteresis effects are eliminated during operation of the device. The magnets are similar to magnets 55 and 58 in the device shown in Fig. 2.

When in use, body member 75 is suitably secured to some supporting structure in the aircraft or the like, and when angular acceleration or deceleration forces act on the device, member 86 will tend to rotate with respect to the body member and stress wire 108, thereby altering its magnetic permeability as previously described. It should be noted that when the wire is prestressed by moving member 86 longitudinally with respect to the body member by means of plates 95, 96 and bolts 99, the relative movement between the inertia member and the body member is in a plane at right angles to the plane of relative movement between the inertia member and the body member when acted upon by acceleration forces whereby prestressing of the wire does not affect the usual operation of the device.

Although the magnetostrictive wire of the invention device has been shown as a continuous wire, it should be understood that the wire may be composed of small individual loops which surround the coil member. However, it is considered preferable to have a single continuous wire for assembly and economy purposes.

It is evident that although the invention device is particularly adapted for measuring acceleration and deceleration forces, by slightly modifying the device such that the inertia member is adapted to be driven or actuated by other physical forces, such other forces may also be measured by the device.

It is apparent from the foregoing that there is provided a new and novel magnetostrictive accelerometer device which is adapted to measure both acceleration and deceleration forces acting thereon and wherein hysteresis effects are substantially eliminated. Means is provided whereby the band width of the electronically transmitted information provided by the invention device may be controlled, and the device is simple and rugged in construction, yet reliable and accurate in operation.

Obviously many modifications and variations of the present invention are possible in the light of the above teachings. It is therefore to be understood that within the scope of the appended claims the invention may be practiced otherwise than as specifically described.

I claim:

1. In an acceleration or deceleration sensing device: a housing; an inertia member positioned within said housing and mounted for limited freedom of movement in a direction parallel to that of the force to be sensed; a magnetostrictive wire wound in essentially toroidal fashion within said housing, each turn of said wire being secured along the outer periphery of the toroid to said housing and along the inner periphery of the toroid to said inertia member; and a ring-shaped inductance coil supported by said housing and located within the toroid defined by said magnetostrictive wire.

2. The combination of claim 1, further comprising means supported by said housing and positioned adjacent the toroid defined by said magnetostrictive wire for producing a constant magnetic flux which is adapted to saturate said wire.

3. A magnetostrictive acceleration sensing device which comprises a body member adapted to be fixed to a supporting structure, said body member having a cavity formed therein, an inertia member disposed within said cavity and being movably supported by bearings mounted in said body member, a deformable magnetostrictive member supported by said body member and said inertia member an inductance coil disposed adjacent said magnetostrictive member, a plurality of permanent magnets disposed adjacent said magnetostrictive member, and means for creating an initial stress within said magnetostrictive member.

4. A device as defined in claim 3 wherein said last mentioned means comprises means for selectively adjusting the relative position of said body member and said inertia member.

5. A magnetostrictive acceleration sensing device which comprises a body member adapted to be fixed to a supporting structure, said body member having a plurality of passages and a cavity formed therein an inertia member disposed within said cavity and being movably supported by bearings mounted in said body member, a plurality of passages formed in said inertia member and respectively aligned with the passages in said body member, a magnetostrictive wire supported by both said body member and said inertia member and wound in essentially toroidal fashion through the passages in both said members, an inductance coil carried by said body member so as to lie in the space defined by said toroidally-wound wire, positioned within said space, a plurality of permanent magnets supported by said body member and being disposed adjacent said wire, and means for selectively adjusting the relative position of said body member and said inertia member whereby an initial stress is created in said wire.

6. A magnetostrictive acceleration sensing device which comprises a body member having a cavity formed therein, an inertia member disposed within said cavity and being rotatably journaled in said body member, a magnetostrictive member supported by said body member and said inertia member, an inductance coil disposed adjacent said magnetostrictive member, at least one permanent magnet disposed adjacent said magnetostrictive member, and means for selectively adjusting the relative longitudinal position of said body member and said inertia member whereby an initial stress is created in said magnetostrictive member.

7. A magnetostrictive acceleration sensing device which comprises a body member including a first and second portion and having a cavity formed therein, an inertia member disposed within said cavity and being journaled within said second portion of the body member so as to be movable longitudinally relative thereto, a magnetostrictive member supported by said first portion of the body member and said inertia member, an inductance coil disposed adjacent said magnetostrictive member, at least one permanent magnet disposed adjacent said magnetostrictive member, and means for selectively adjusting the relative rotational positions of said first portion of the body member and said inertia member whereby an initial stress is created in said magnetostrictive member.

8. A device as defined in claim 7 wherein said inductance coil is mounted within said first portion of the body member and said permanent magnet is mounted within said second portion of the body member.

References Cited in the file of this patent
UNITED STATES PATENTS
2,511,178    Roters ---------------- June 13, 1950